UNITED STATES PATENT OFFICE.

AMAND FRANÇOIS PASQUIER, OF DIJON, FRANCE.

PROCESS FOR DEPHOSPHORIZING PIG-IRON.

1,145,506.  Specification of Letters Patent.  Patented July 6, 1915.

No Drawing. Application filed November 20, 1912. Serial No. 732,537.

*To all whom it may concern:*

Be it known that I, AMAND FRANÇOIS PASQUIER, citizen of the French Republic, residing at No. 55 Rue du Faubourg Raines, Dijon, in the Department of Côte-d'Or, France, have invented new and useful Improvements in the Process for Dephosphorizing Pig-Iron, of which the following is a specification.

The present invention has for its object to provide a process of dephosphorizing pig iron in a basic or neutral converter by the simultaneous use of oxid of iron and lime.

This process consists in introducing directly into the molten iron the mixture of oxid of iron and lime in the air blast and in periodically eliminating during the operation the slag formed. All the phosphorus in the pig iron passes into the slag in the state of calcium phosphate and is eliminated with the slag without resorting to over-blowing or recarburation.

In the process constituting the present invention the lime and oxid or iron are introduced simultaneously in the air blast and act in the following manner:—The oxid of iron rapidly transforms the phosphorus in the pig iron into phosphoric acid which, in consequence of the presence of the lime introduced at the same time as the oxid of iron, combines therewith and passes into the slag as calcium phosphate. The slag carries off the phosphorus in the well-known manner, it being understood that the slag is frequently drawn off. The phosphorus is thus eliminated from the mass of iron without having recourse to over-blasting or to recarburation. Steel free from phosphorus and of any degree of hardness can thus be manufactured in a simplified manner.

This process permits of treating iron ores of extremely variable composition. As to the suppression of over-blasting and of recarburation the process effects a shortening of the duration of the operation and effects economies in the way of expensive additions of ferromanganese, ferro-silicon and the like.

Instead of lime, analogous bases may be employed such as magnesia, dolomite and others.

The iron ore which may be added in varying proportions with the lime, facilitates the formation of slag of determined composition at different moments of the operation according to the composition of the pig iron which is being treated, and the hardness of the steel which it is desired to produce. For the iron ore, there may be substituted hammer scale or forge scale, and generally any oxid compound of iron. For the lime there may be substituted carbonate of lime or any other compound of lime. The same applies to bases that are analogous to lime. The use of carbonate of lime is specially indicated when treating pig iron which work too hot in the converter.

The materials to be introduced into the air blast are reduced to powder of sufficient fineness to allow of their passing easily through the twyers and of their being readily carried alone by the air blast.

Having now described my invention what I claim as new and desire to secure by Letters Patent is:—

1. The process of dephosphorizing pig iron in a basic or neutral converter consisting in introducing into the molten mass an air blast carrying a mixture of finely divided oxid of iron and lime and periodically removing during the operation the phosphorus containing slag.

2. The process of dephosphorizing pig iron in a basic or neutral converter consisting in introducing into the molten mass an air blast carrying a mixture of finely divided iron ore and lime and periodically removing during the operation the phosphorus containing slag.

3. The process of dephosphorizing pig iron in a basic or neutral converter consisting in introducing into the molten mass an air blast carrying a mixture of finely divided oxid of iron and alkaline earth base and periodically removing during the operation the phosphorus containing slag.

4. The process of dephosphorizing pig iron in a basic or neutral converter consisting in blasting the molten iron, short of decarburizing, with air carrying a finely divided dephosphorizing body and periodically removing during the operation the phosphorus containing slag .

In testimony whereof I have signed my name to this specification in the presence of two subscribing witnesses.

AMAND FRANÇOIS PASQUIER.

Witnesses:
 NICOLAS CHAPINS,
 A. VEART.

Copies of this patent may be obtained for five cents each, by addressing the "Commissioner of Patents, Washington, D. C."